United States Patent
Ederer et al.

(10) Patent No.: US 10,052,682 B2
(45) Date of Patent: Aug. 21, 2018

(54) 3D MULTI-STAGE METHOD

(71) Applicant: VOXELJET AG, Friedberg (DE)

(72) Inventors: Ingo Ederer, Geltendorf (DE); Daniel Günther, München (DE)

(73) Assignee: VOXELJET AG, Friedberg (DE)

( * ) Notice: Subject to any disclaimer, the term of this patent is extended or adjusted under 35 U.S.C. 154(b) by 153 days.

(21) Appl. No.: 14/435,269

(22) PCT Filed: Oct. 10, 2013

(86) PCT No.: PCT/DE2013/000589
§ 371 (c)(1),
(2) Date: Apr. 13, 2015

(87) PCT Pub. No.: WO2014/056482
PCT Pub. Date: Apr. 17, 2014

(65) Prior Publication Data
US 2015/0273572 A1  Oct. 1, 2015

(30) Foreign Application Priority Data

Oct. 12, 2012  (DE) ........................ 10 2012 020 000

(51) Int. Cl.
*B29C 71/02*  (2006.01)
*B22C 9/02*  (2006.01)
(Continued)

(52) U.S. Cl.
CPC ................. *B22C 9/02* (2013.01); *B22C 1/18* (2013.01); *B22C 1/22* (2013.01); *B29C 64/165* (2017.08); *B29C 64/171* (2017.08)

(58) Field of Classification Search
CPC ... B29C 67/0081; B29C 71/02; B29C 64/165; B29C 64/171
(Continued)

(56) References Cited

U.S. PATENT DOCUMENTS 3,913,503 A  10/1975 Becker
4,247,508 A   1/1981 Housholder
(Continued)

FOREIGN PATENT DOCUMENTS

AU    720255 B2   5/2000
DE    832937 C    3/1952
(Continued)

OTHER PUBLICATIONS

US 4,937,420, 06/1990, Deckard (withdrawn)
(Continued)

*Primary Examiner* — Leo B Tentoni
(74) *Attorney, Agent, or Firm* — The Dobrusin Law Firm, P.C.

(57) ABSTRACT

The present invention relates to a multi-stage method for producing one or multiple molded bodies, the method comprising the following steps: a) constructing one or multiple molded bodies in layers by repeatedly applying particulate material by the 3D printing method; b. a presolidification step for achieving a presolidification of the molded body; c. an unpacking step, wherein the unsolidified particulate material is separated from the presolidified molded body; d. a final solidification step, in which the molded body receives its final strength due to the action of thermal energy. The invention also relates to a device which may be used for this method.

20 Claims, 2 Drawing Sheets

(51) Int. Cl.
  *B29C 64/171* (2017.01)
  *B22C 1/18* (2006.01)
  *B22C 1/22* (2006.01)
  *B29C 64/165* (2017.01)

(58) Field of Classification Search
  USPC .......................................... 264/113, 236, 347
  See application file for complete search history.

(56) References Cited

U.S. PATENT DOCUMENTS

| | | |
|---|---|---|
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A * | 12/1999 | Danforth ............ B29C 67/0081 264/219 |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |

(56) References Cited

U.S. PATENT DOCUMENTS

| | | |
|---|---|---|
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom et al. |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0176346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0059247 A1 | 3/2011 | Kuzusako et al. |
| 2011/0177188 A1 | 7/2011 | Bredt et al. |

(56) References Cited

U.S. PATENT DOCUMENTS

| | | |
|---|---|---|
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4325573 | 2/1995 |
| DE | 29506204 U1 | 6/1995 |
| DE | 4440397 C1 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19723892 C1 | 9/1998 |
| DE | 19853834 | 5/2000 |
| DE | 10227224 A1 | 1/2004 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102006038858 | 2/2008 |
| DE | 102007040755 A1 | 3/2009 |
| DE | 102007047326 A1 | 4/2009 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 0361847 B1 | 4/1990 |
| EP | 0431924 A2 | 6/1991 |
| EP | 0711213 B1 | 5/1996 |
| EP | 1415792 | 5/2004 |
| EP | 1457590 A | 9/2004 |
| EP | 1524049 A2 | 4/2005 |
| EP | 1381504 B1 | 8/2007 |
| GB | 2297516 A | 8/1996 |
| JP | S62275734 A | 11/1987 |
| JP | 2003136605 A | 5/2003 |
| JP | 2004082206 A | 3/2004 |
| JP | 2009202451 A | 9/2009 |
| WO | 01/34371 A2 | 5/2001 |
| WO | 01/40866 A2 | 6/2001 |
| WO | 2001/078969 A2 | 10/2001 |
| WO | 2004/014637 A1 | 2/2004 |
| WO | 2005/097476 A2 | 10/2005 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2015/078430 A1 | 6/2015 |
| WO | 2015/081926 A1 | 6/2015 |
| WO | 2015/085983 A2 | 6/2015 |
| WO | 2015/090265 A1 | 6/2015 |
| WO | 2015/090567 A1 | 6/2015 |
| WO | 2015/096826 A1 | 7/2015 |
| WO | 2015/149742 A1 | 10/2015 |
| WO | 2015/180703 A1 | 12/2015 |
| WO | 2016/019937 A1 | 2/2016 |
| WO | 2016/019942 A1 | 2/2016 |
| WO | 2016/058577 A1 | 4/2016 |
| WO | 2016/095888 A1 | 6/2016 |
| WO | 2016/101942 A1 | 6/2016 |
| WO | 2016/146095 A1 | 9/2016 |

OTHER PUBLICATIONS

International Search Report, Application No. PCT/DE2013/000589, dated Feb. 25, 2014.

International Preliminary Report on Patentability and Written Opinion of the International Search Authority, Application No. PCT/DE2013/000589, dated Feb. 25, 2014.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, p. 130-133.

Gebhart, Rapid Prototyping, pp. 118-119, 1996.

Feature Article—Rapid Tooling—Cast Resin and Sprayed Metal Tooling by Joel Segal, Apr. 2000.

EOS Operating Manual for Laser Sintering Machine with Brief Summary Feb. 22, 2005.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, pp. 143-151, Jan. 1990.

(56) References Cited

OTHER PUBLICATIONS

Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".

\* cited by examiner

3D MULTI-STAGE METHOD

CLAIM OF PRIORITY

This application is a national phase filing under 35 USC § 371 from PCT Application serial number PCT/DE2013/000589 filed on Oct. 10, 2013, and claims priority therefrom. This application further claims priority from German Patent Application number DE 10 2012 020 000.5 filed on Oct. 12, 2012. Both PCT/DE2013/000589 and DE 10 2012 020 000.5 are incorporated herein in their entireties by reference.

FIELD OF THE INVENTION

The present invention relates to a multi-stage 3D printing method as well as a device which may be used for this method.

BACKGROUND OF THE INVENTION

A wide range of methods are known for producing molds and foundry cores. Automated machine molding methods are an economical approach in the area of large batches. Tool-less mold production using so-called rapid prototyping methods or 3D printing methods are an alternative to machine molding methods for small to medium-sized series.

Laser sintering methods that permit tool-less manufacturing were developed based on the Croning Method (DE832937), which is known by the name of its inventor, Johannes Croning. According to this method, a molded part is built in layers from particulate material that is coated with a binder. The binding of the individual loose particles is achieved, for example, by applying energy with the aid of a laser beam (EP 0 711 213).

In practice, the solidification described in the prior art is scarcely reached by means of the polycondensation reaction, since process difficulties occur. An exposure to light that is sufficient for developing the final strength would thus result in a severe shrinkage of the binder casing and this, in turn, would cause a process-incompatible distortion of the present layer. The strengths (green strength) of the molded parts produced in this manner are therefore extremely low during removal of the molded parts—also referred to as unpacking—from the loose sand. This causes problems when unpacking and not infrequently results in damage to the molded parts, rendering them unusable. A method has been described for solving this problem during unpacking by using a soldering lamp and thus additionally solidifying the surface with the aid of a soldering lamp. However, this procedure not only requires a great deal of experience, it is also extremely labor-intensive and time-consuming.

The lack of green strengths is due to excessively small or excessively weak binder bridges. If one wishes to engage in distortion-free production, the binder remains excessively viscous and does not form an adequate bridge.

However, a layering method is described in DE 197 23 892 C1, in which Croning sand is printed with a moderating agent, which causes the activation energy of the printed binder-encased Croning sand to be increased or decreased with respect to the unprinted material, and the sand is then exposed to light with the aid of a thermal radiation source. This is intended to cause only the printed or the unprinted areas to be hardened or bound. The finished molded parts are then removed from the unbound sand. However, it has been determined that suitable moderating agents, such as sulfuric acids, are only poorly suited or not suited at all for being printed with the aid of commercial single drop generators. It has also been determined to be disadvantageous that the unsolidified sand is pre-damaged by the exposure to light to such an extent that it may no longer by fully reused in the method. This not only increases the amount of material used but also the costs and is therefore disadvantageous.

A layering method for producing models is described in US 2005/0003189 A1, in which a thermoplastic particulate material is mixed with a powdered binder and printed in layers with an aqueous solvent. The binder should be easily soluble in the aqueous print medium. The models are subsequently removed from the surrounding powder and possibly dried in an oven during a follow-up process for the purpose of increasing the strength.

A layering method for producing investment-cast original models is described in DE 102 27 224 B4, in which a PMMA particulate material, which is coated with a PVP binder, is printed in layers with a mixture of a solvent and an activator for the purpose of dissolving the binder and activating the binder action.

Either the known methods are tool-dependent processes or the known 3D printing processes achieve green strengths that are too low for the efficient and economically advantageous manufacture of molded parts.

DESCRIPTION OF THE INVENTION

Therefore, there was the need to provide a method for the tool-less construction of molded parts in layers, preferably for foundry applications, with the aid of binder-encased particulate material, in which removal strengths or unpacking strengths are achieved which make it possible to reduce or entirely avoid time-consuming and cost-intensive manual work and preferably facilitate machine- or robot-assisted unpacking, or in any case to reduce or entirely avoid the disadvantages of the prior art.

Preferred embodiments are implemented in the subclaims.

In particular, the object is achieved by a method for producing one or multiple molded bodies, the method including the following steps:

a. constructing one or multiple molded bodies in layers by repeatedly applying particulate material by the 3D printing method;
b. a presolidification step for achieving a presolidification of the molded body;
c. an unpacking step, wherein the unsolidified particulate material is separated from the presolidified molded body;
d. a final solidification step, in which the molded body receives its final strength due to the action of thermal energy.

The molded body is preferably subjected to one or multiple additional processing steps. All other methods or work steps known to those skilled in the art may be used. The one or multiple additional processing steps are selected, for example, from the group comprising polishing or dyeing.

In the method according to the invention, the molded body (also referred to as the component) is solidified in the presolidification step to the extent that an unpacking from the unsolidified particulate material is possible, and the molded body essentially retains its shape defined in the 3D printing method. In particular, shrinkage or the like is essentially avoided. The unpacking operation may take place manually or mechanically or in a robot-assisted manner.

Flexural strengths of more than 120 N/cm², preferably more than 200 N/cm², particularly preferably 120 to 400

N/cm² may be achieved in the presolidified molded body (green body) after the presolidification step.

After unpacking, the molded body may again be surrounded by particulate material, which is preferably inert, to thereby be able to support the molded body in the subsequent heat treatment step and better conduct the heat as well as to achieve a uniform heat conduction. Shaking devices may be used to evenly distribute the particulate material.

The object of the application is also achieved by a device or device arrangement for this method.

Flexural strengths of more than 250 N/cm², preferably from 250 to 750 N/cm², preferably more than 750 N/cm², particularly preferably more than 1,000 N/cm², even more preferably more than 1,200 N/cm² may be achieved in the molded body after the final solidification step.

In one preferred embodiment, the method is carried out in such a way that the presolidification step takes place without the application of additional thermal energy.

The presolidification step will preferably take place using a solvent and/or a polymerization reaction.

The final solidification step may preferably take place with the aid of heat treatment. However, other final solidification methods and treatments known to those skilled in the art are also possible.

The component may be supported by inert material during the heat treatment.

Temperatures of preferably 110° C. to 130° C., preferably 130° C. to 150° C. particularly preferably 150° C. to 200° C. are used in the final solidification step.

The temperature at the component is preferably in the time range of 2 to 24 hours; particularly preferably the temperature is maintained over 2 to 5 hours.

Natural silica sand, kerphalite, cera beads, zircon sand, chromite sand, olivine sand, chamotte, corundum or glass spheres are used as the particulate material.

The particulate material is characterized by a single-phase coating or casing having one or multiple materials. The coating or the casing may preferably be a binder.

In the method according to the invention, the casing or coating preferably comprises or includes thermoplastic polymers, soluble polymers, waxes, synthetic and natural resins, sugars, salts, inorganic network formers or water glasses.

The solvent preferably comprises or includes water, hydrocarbons, alcohols, esters, ethers, ketones, aldehydes, acetates, succinates, monomers, formaldehyde, phenol and mixtures thereof.

In the method, the binder may contain polymerizable monomers. In one preferred embodiment of the method, the coating or casing contains materials for starting a polymerization with the binder.

The material contained in the casing or coating preferably contributes to the final strength or to the preliminary strength in the presolidification step and to the final strength in the final solidification step.

In the method according to the invention, according to one preferred embodiment, two different materials are contained in the casing or coating, the one material being essentially destined for the presolidification step and the other material essentially being destined for the final solidification step.

The method is thus simplified, may be carried out faster and is thus more economical.

The coating or casing may preferably contain a color indicator which is activated by the binder.

In another aspect, the invention relates to a device or a device arrangement suitable for carrying out the method according to the invention.

The first step of the method according to the invention may, in principle, be carried out as described in the prior art for 3D printing methods. In this regard, EP 0 431 924 B1 and DE102006038858 A1 are cited by way of example. The subsequent unpacking step may be carried out manually but preferably in a mechanically assisted manner. Robot-assisted unpacking is another preferred variant of a mechanical method step according to the invention. In this case, both the unpacking, i.e., the removal of the unsolidified particulate material, and the transfer of the molded part may take place with the aid of computer-controlled gripper arms and extraction units.

The invention is preferably carried out with the aid of a particulate material bed-based 3D printing method. The desired molded body is created during 3D printing by repeated layering. For this purpose, particulate material is applied (leveled) in a thin layer onto a surface. An image according to the section of the desired 3D object is printed using an ink-jet print head. The printed areas solidify and bond to underlying, already printed surfaces. The resulting layer is shifted by the thickness of one layer according to the design of the equipment.

3D printers may be used which lower the layer in the direction of gravity. Machines are preferably used which are designed according to the cycling principle, and the layers in this case are moved in the conveyance direction. Particulate material is now again applied to the building surface. The build process, which involves the steps of coating, printing and lowering, continues to be repeated until the one or more molded body(ies) is/are finished.

The method step of 3D printing and the presolidification step are preferably implemented by selectively printing a solvent onto the binder-encased particulate material. The solvent liquefies the casing. The viscosity is significantly lower than in thermal melting. While the viscosities of polymer melts may be in the range of approximately 10 to 1,000 Pas, a polymer solution may reach a viscosity of a few mPas, depending on the quantity added and the solvent. A viscosity of 2 to 100 mPas is preferred, 2 to 10 mPas is more preferred, 2 to 5 mPas is even more preferred.

When drying the solvent, the fluid mixture withdraws into the contact point between two particles and then leaves behind a strong bridge. The effect may be strengthened by adding polymers to the printing fluid. In this case, suitable method conditions are selected or corresponding components that are necessary for a polymerization reaction are worked into either the solvent or into the coating of the particulate material. All resins or synthetic resins known to those skilled in the art and which are suitable for polymerization, polyaddition or polycondensation reactions may be used. Materials of this type are preferably defined by DIN 55958 and are added to the disclosure of this description with reference thereto.

According to the invention a binder-encased foundry molding material may be used as the particulate material. The casing is solid at room temperature. The particulate material is thus pourable and free-flowing. The material encasing the particles is preferably soluble in the printing fluid that is applied by the ink-jet print head. In a similarly preferred design, the printing fluid contains the casing material or its precursors in the form of a dispersion or solution.

The material present in the printing fluid may likewise preferably belong to a different material group. In one embodiment of the invention, the solvent dissipates into surrounding particulate material or into the atmosphere by means of evaporation. Likewise, the solvent may also react and solidify with the casing material.

The material groups for the particulate material and the casing are varied. The base materials may be, for example, natural silica sand, kerphalite, cera beads, zircon sand, chromite sand, olivine sand, chamotte or corundum. However, other particulate base materials are also generally suitable. The casing may be organic or inorganic. It is applied either thermally, in solution or by mechanical striking or rolling.

In addition to phenol resin, examples of suitable binders are furan, urea or amino resins, novolaks or resols, urea formaldehyde resins, furfuryl alcohol urea formaldehyde resins, phenol-modified furan resins, phenol formaldehyde resins or furfuryl alcohol phenol formaldehyde resin, which may each be present in liquid, solid, granulated or powdered form. The use of epoxy resins is also possible.

For example, encased silica sand having an average grain size of approximately 140 µm, such as the RFS-5000 product from Húttenes-Albertus Chemische Werke, is particularly preferred. It is supplied with a resol resin casing. In one simple design, an ethanol/isopropyl alcohol mixture may be used as the printing fluid. Predissolved resin may also be added to the printing fluid. One example of this is the Corrodur product from Húttenes-Albertus. According to the invention, a strength of more than 120 N/cm$^2$ results after a time period of 24 hours following the printing process and the addition of 10 wt % liquid binder. Even delicate structures may be quickly unpacked thereby.

A highly concentrated material in the form of predissolved resin of the Corrodur type may furthermore preferably be used as liquid binder for the system. Dioxolane may be used as the solvent additive. Due to the high proportion of resin, molding base materials having a low casing content may be selected. Likewise, untreated sand may be used—with a loss in strength. The design according to the invention in this case may be seen in the complete dissolution of the coating material.

In one particularly preferred embodiment, the materials used in the first method step of 3D printing already include all components required for the final solidification step, preferably binders in the particulate material, which are first bound in the presolidification step using another binding mechanism (physical instead of chemical or vice versa) or other materials (binder in the printing solution) and react/solidify in the subsequent final solidification step in such a way that the advantageous final strength is achieved. It is thus advantageously possible to simplify the different solidification steps in that the particulate material already contains, in the first method step, all materials required for final solidification, and it is possible to achieve the advantageous final strength without introducing additional material in the heat treatment step.

Using the method according to the invention and the device according to the invention, by combining materials and method conditions, the inventors were able to advantageously achieve the fact that an efficient method was provided, which makes it possible to combine work steps, reduce the use of manual steps and thus positively improve the process speed. Using the method according to the invention, it is also possible to achieve flexural strengths in the green body which are sufficient to supply it to a thermal solidification step without damage or other impairments and without the use of tools in the 3D printing method.

Using the method according to the invention and the devices suitable therefor, it is surprisingly possible to include all the materials required for the presolidification step as well as the final heat solidification step in the particulate material. It was astonishing that the combined materials, i.e., the active materials for the presolidification step as well as the final solidification step, did not interact in a way that resulted in interactions between these materials that were detrimental to the method.

By purposefully selecting the materials, the inventors were indeed able to achieve an advantageous effect in preferred embodiments for both the presolidification step and the final solidification step. It has proven to be particularly advantageous that all components required for the method—with the exception of the binder—could be combined into one particulate material, and only one single particulate material may thus be used without the need for additional mixing steps or application steps.

The particularly preferred material combinations according to preferred embodiments are Illustrated in the examples. Subcombinations of materials from different examples may also be used together.

Figure 3:
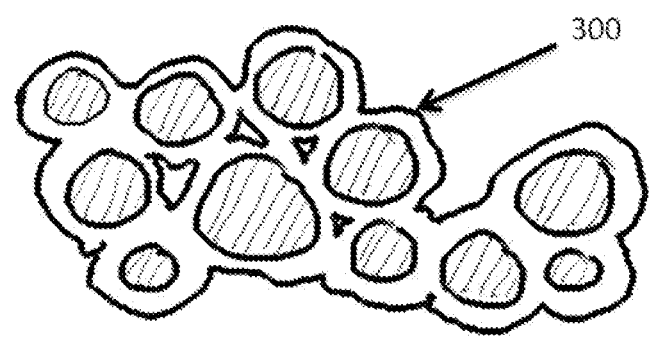
FIG. 3 shows the structure of a presolidified molded body (300).

As described above, the molded body is formed by binding individual particles (FIG. 3).

Figure 1:
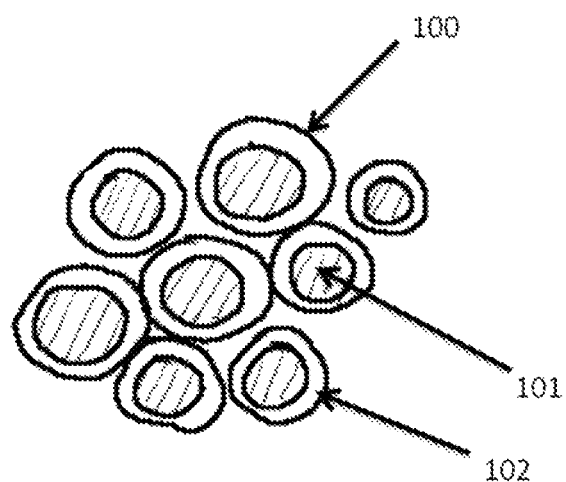
FIG. 1 shows particulate material (100), a sand grain (101) being encased with binder (102).

The particulate material-based process is based on a particulate material (100) which is encased by a binder (102) (FIG. 1). Casing (102) characteristically has different properties than base material (101). The sand known from the Croning process may be mentioned as an example. In this case, a grain of sand (101) is coated with a novolak resin (102). This resin is melted on and mixed with the sand during the manufacturing process. The sand continues to be mixed until the resin has cooled. The individual grains are separated thereby and a pourable material (100) results.

Base materials having an average grain diameter between 10 and 2,000 µm may be considered as suitable sands for processing in the method according to the invention. Different base materials, such as natural silica sand, kerphalite, cera beads, zircon sand, chromite sand, olivine sand, chamotte, corundum and glass spheres are suitable for subsequent use in casting processes.

Binders may be applied in a wide range of materials. Important representatives are phenol resins (resol resins and novolaks), acrylic resins and polyurethanes. All thermoplastics may furthermore be thermally applied to the grains. Examples of materials that may be used according to the invention are polyethylene, polypropylene, polyoxymethylene, polyamides, acrylonitrile, acrylonitrile styrene butadiene, polystyrene, polymethyl methacrylate, polyethyl methacrylate and polycarbonate.

Additionally or entirely without the supply of heat, solvents may be used to coat grains coated according to the invention with a bindable material. Other casings may also be implemented by means of solvents. For example, water glass may be dissolved in water and mixed with sand. The material is subsequently dried and broken. Excessively coarse particles are removed by sieving. Since the dissolution process is reversible, the material thus obtained may be used in the process according to the invention by printing it with water as the printing fluid.

In one preferred embodiment of the invention materials may be provided in casing (102) which demonstrate a reaction with the fluid binder during the dissolution process. For example, starters may be provided for a polymerization. In this manner, the evaporation process of the solvent in the particulate material may be accelerated, since less printing solution needs to escape from the particulate material cake by evaporation. As a result, the molded parts may reach their green strength faster and thus be unpacked from the particulate material earlier.

Since the printed parts do not differ much from the surrounding loose particulate material in a solvent process, it may be sensible to dye the molded parts by introducing a pigment into the print medium. In this case, it is possible to use a color reaction based on the combination of two materials. For example, litmus may be used in the solvent. The base material is mixed with the salt of an acid prior to coating with the binder. As a result, not only is a dyeing possible but also a control of the intensity of the dissolution reaction. If the reactive substance, for example, is in direct contact with the grain of the base material, and if it is protected by the casing, the color indicator shows that the casing was completely dissolved.

Figure 2:
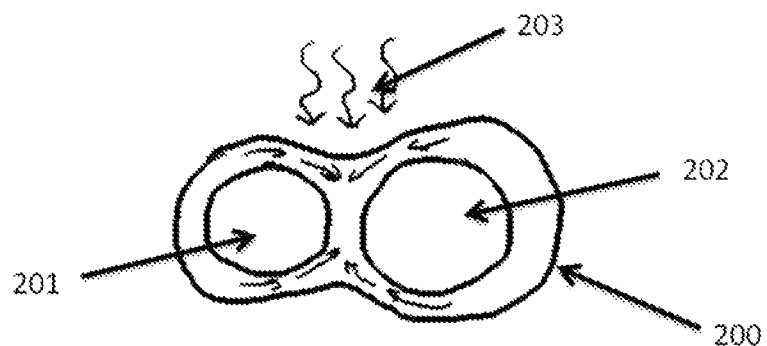
FIG. 2 shows the process of evaporating particulate material (200), to which solvent was added, whereby the particles (200, comprising 201 and 202) are bound and the material is presolidified. The evaporation of the solvent may also be accelerated by the application of heat (203).

The process of evaporating the solvent may also be accelerated by supplying heat (FIG. 2). This may take place by means of convection or heat radiators. The combination of an air draft and heating is particularly effective. It should be noted that if the drying process is too fast, the binder may only be partially dissolved. Optimum values with regard to strength development and unpacking time may be ascertained through tests and variations of the solvent.

Figure 4:
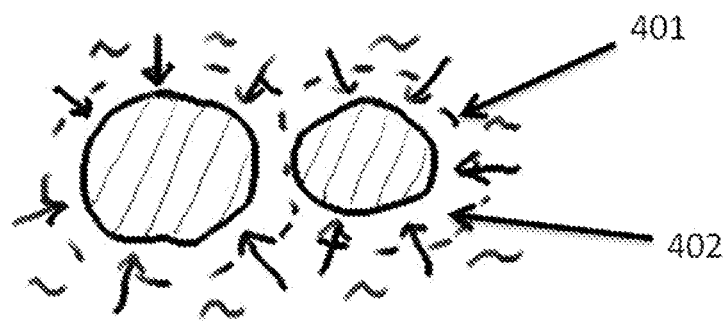
FIG. 4 shows the operation after printing; in this case the solvent begins to penetrate binder coating (402) of particle core (401).
Figure 5:
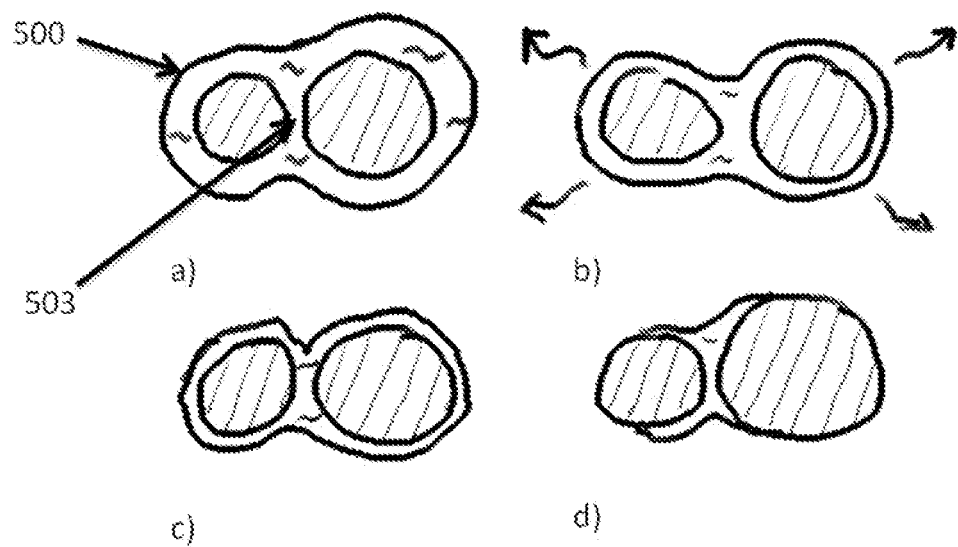
FIGS. 5a through 5d show the evaporation process of the solvent, the mixture concentrating in the contact point (503) between the particles (500) (FIG. 5d).

A printing fluid is applied to the coated grain in the printing process. In its main function, the printing fluid dissolves the binder casing. In the case of Croning sand, approximately 10 wt % of printing fluid is printed for this purpose. Isopropyl alcohol, for example, is suitable as the solvent. After printing, the solvent begins to penetrate the binder casing (FIG. 4). The concentration of the casing material in the solvent increases. When solvent evaporates, the mixture concentrates in the contact point between the particles (FIG. 5). Additional evaporation causes the casing material in the contact point to solidify. Due to the comparatively low viscosities, a favorable process window results, in contrast to melting processes. With the aid of commercial Croning sand of the Hüttenes-Albertus RFS 5000 type, for example, an unpacking flexural strength of more than 100 N/cm$^2$, preferably more than 120 N/cm$^2$, is reached. This is sufficient to unpack even large-format, delicate parts safely and distortion-free.

After the removal method step—also referred to as unpacking—the molded parts are supplied to the final solidification step. The molded parts are subsequently supplied to additional follow-up processes. This method step of the invention is preferably carried out in the form of a heat treatment step. Parts made of Croning sand, which are manufactured according to the process according to the invention, may be used as an example. After unpacking, these parts are preferably re-embedded in another particulate material. However, this material does not have a binder casing and preferably has good thermal conductivity. The parts are subsequently heat-treated above the melting temperature of the binder in an oven. In one of the preferred embodiments, the special phenol resin of the casing is cross-linked, and the strength increases significantly. Melting adhesives are generally preferred for this method step of final solidification. The following may preferably be used as base polymers: PA (polyamides), PE (polyethylenes). APAO (amorphous poly alpha olefines), EVAC (ethylene vinyl acetate copolymers), TPE-E (polyester elastomers), TPE-U (polyurethane elastomers). TPE-A (copolyamide elastomers) and vinylpyrrolidone/vinyl acetate copolymers. Other common additives known to those skilled in the art, such as nucleating agents, may be added.

Using the method according to the invention, molded parts having flexural strengths of more than 1.000 N/cm$^2$ are produced with the aid of commercial sands

EXAMPLE 1

A Croning sand of the Hüttenes-Albertus RFS 5000 type is used in a layering process. For this purpose, the sand is deposited onto a build plane in a 0.2-mm layer. With the aid of a drop-on-demand print head, the sand is subsequently printed with a solution of isopropyl alcohol according to the cross-sectional surface of the desired object in such a way that approximately 10 wt % is introduced into the printed areas. The build plane is then shifted relative to the layering mechanism by the thickness of the layer, and the operation comprising the layer application and printing starts again. This cycle is repeated until the desired component is printed. The entire operation is carried out under normal conditions. The temperature in the process room should be between 18° C. and 28° C., preferably between 20° C. and 24° C.

Approximately 24 hours must pass before the final layers of sand have developed an adequate strength. The component may then be unpacked, i.e., removed from the surrounding sand and freed of all powder deposits. When printed test bodies are dried in the circulating air oven for 30 minutes at a temperature of 40° C., they demonstrate a flexural strength of 120 N/cm$^2$.

The parts are then prepared for the subsequent heat treatment step. For this purpose, they are introduced, for example, into uncoated sand, which is situated in a temperature-resistant container. To ensure a good contact between the part and the supporting sand, vibrations are applied to the container during placement and filling with sand.

Any deformation may be avoided in the manner during the hardening reaction, i.e., the final solidification step, at high temperatures. The component is thus heated in the oven for 10 hours at a temperature of 150° C. After removal from the oven, approximately 30 minutes must again pass until the component has cooled enough to allow it to be handled and removed from the powder bed. Following this process step, the deposits may be removed by sand blasting. Treated bending test bodies demonstrate a flexural strength of 800 to 1,000 N/cm$^2$ following this final solidification step.

EXAMPLE 2

A layering process is carried out in a manner similar to the first example. A Croning sand of the Hüttenes-Albertus CLS-55 type is used in this case. For this purpose, the sand is again deposited onto a build plane in a 0.2-mm layer. A solution of 15% Corrodur from Húttenes-Albertus, 42.5% ethanol and 42.5% isopropyl alcohol is used as the printing fluid.

Approximately 10 wt % of fluid is printed onto the sand.

The flexural strength after unpacking the molded body and completing this first method step, which is also referred to as the presolidification step, is 140 N/cm² in this case. The final flexural strength after the second method step, which is also referred to as the final solidification step, is again 800 N/cm².

EXAMPLE 3

The process for this preferred manufacturing method is carried out in a manner similar to the previous examples. In this case, strengths of 800 N/cm² are achieved using untreated sand as the base. A mixture of 50% Corrodur and 50% dioxolane is used as the binder fluid. 10 wt % are printed. The process takes place at room temperature. The component does not have to be unpacked from the particulate material after printing, since the unencased material cannot be bound by means of thermal energy. Either the entire box or, for example, one printed box may be introduced into the oven to carry out the final solidification step. A sand volume of 8×8×20 cm, which contains a bending test body, is heat-treated in the oven for 24 hours at a temperature of 150°. The strength upon conclusion of the final solidification step is approximately 800 N/cm². A determination of the organic proportion by means of ignition loss determination demonstrates 5 wt %. The material in this case corresponds to the RFS-5000 and CLS-55 products from Húttenes-Albertus. After the oven process, the parts may be cleaned by sand blasting.

What is claimed is:

1. A method for producing one or multiple molded bodies, wherein the method comprises the following steps:
    a. constructing one or multiple molded bodies in layers by repeatedly applying particulate material including a casing or coating and selectively printing a fluid including a solvent on the particulate material, wherein the casing or coating includes a soluble polymer;
    b. a pre-solidification step for achieving a pre-solidification of the molded body, wherein the pre-solidification step includes forming a bridge between two adjacent particles of the particulate material by liquefying the soluble polymer with the solvent and then solidifying by removing the solvent from the bridge;
    c. an unpacking step, wherein the unsolidified particulate material is separated from the pre-solidified molded body; and
    d. a final solidification step, after the unpacking step, in which the pre-solidified molded body receives its final strength due to the action of thermal energy;
    wherein the action of thermal energy includes a chemical mechanism.

2. The method according to claim 1, wherein the final solidification step includes heating to a temperature from 110° C. to 200° C.

3. The method according to claim 2, wherein the the casing or coating includes a binder.

4. The method according to claim 2, wherein the casing or coating comprises or includes thermoplastic polymers, soluble polymers, waxes, synthetic and natural resins, sugars, salts, inorganic network formers or water glasses.

5. The method according to claim 1, wherein the pre-solidification step takes place using a solvent comprising water, hydrocarbons, alcohols, esters, ethers, ketones, aldehydes, acetates, succinates, monomers, formaldehyde, phenol and mixtures thereof.

6. The method according to claim 3, wherein the binder contains polymerizable monomers.

7. The method according to claim 2, wherein the pre-solidified molded body has a flexural strength of more than 120 N/cm² and the molded body has a flexural strength of more than 250 N/cm² after the final solidification step;
    wherein the material contained in the casing or coating contributes to the final strength or to the preliminary strength in the pre-solidification step and to the final strength in the final solidification step.

8. The method of claim 1, wherein the molded body is subjected to one or multiple additional processing steps;
    the molded body is solidified in the pre-solidification step to the extent that an unpacking from the unsolidified particulate material is possible, and the molded body essentially retains its shape defined in the 3D printing method;
    the unpacking takes place manually or mechanically or in a robot-assisted manner;
    the pre-solidified molded body (green body) has a flexural strength of more than 120 N/cm² following the pre-solidification step;
    the molded body has a flexural strength of more than 250 N/cm² after the final solidification step;
    the pre-solidification step takes place without the introduction of additional thermal energy;
    the pre-solidification step takes place using a solvent and/or a polymerization reaction;
    the final solidification step takes place with the aid of heat treatment; and
    the body is heat-treated with the assistance of an inert material.

9. The method of claim 8, wherein the presolidified molded body (green body) has a flexural strength of 120 to 400 N/cm² following the presolidification step; and the molded body has a flexural strength of more than 750 N/cm² after the final solidification step.

10. The method of claim 1, wherein a temperature in the final solidification step is from 130° C. to 200° C.

11. The method of claim 2, wherein the temperature at the component is maintained within a time range of 2 to 24 hours.

12. The method of claim 11, wherein natural silica sand, kerphalite, cera beads, zircon sand, chromite sand, olivine sand, chamotte, corundum or glass spheres are used as the particulate material.

13. The method of claim 6, wherein the coating or casing contains materials for starting a polymerization with the binder.

14. The method of claim 8, wherein the casing or coating includes one or multiple materials;
    the casing or coating includes a binder;
    the casing or coating comprises or includes thermoplastic polymers, soluble polymers, waxes, synthetic and natural resins, sugars, salts, inorganic network formers or water glasses;
    the pre-solidification step takes place using a solvent comprising water, hydrocarbons, alcohols, esters, ethers, ketones, aldehydes, acetates, succinates, monomers, formaldehyde, phenol and mixtures thereof;
    the casing or coating contains materials for starting a polymerization with the binder;

the pre-solidified molded body has a flexural strength of more than 120 N/cm$^2$ and the molded body has a flexural strength of more than 250 N/cm$^2$ after the final solidification step;

the material contained in the casing or coating contributes to the final strength or to the preliminary strength in the pre-solidification step and to the final strength in the final solidification step; and two different materials are contained in the casing or coating, the one material being essentially destined for the pre-solidification step and the other material essentially being destined for the final solidification step.

15. The method of claim 1, wherein only the fluid including the solvent is printed on the particulate material.

16. A method for producing one or multiple molded bodies, wherein the method comprises the following steps:
  a. constructing one or multiple molded bodies in layers by repeatedly applying particulate material by the 3D printing method;
  b. a pre-solidification step for achieving a pre-solidification of the molded body;
  c. an unpacking step, wherein the unsolidified particulate material is separated from the pre-solidified molded body; and
  d. a final solidification step, in which the pre-solidified molded body receives its final strength due to the action of thermal energy;
  wherein the particulate material includes a base material and a coating or casing; and
  the coating or casing contains a color indicator which is activated by a binder.

17. The method of claim 16, wherein the molded body is subjected to polishing, dyeing, or both.

18. A method for producing one or multiple molded bodies, wherein the method comprises the following steps:
  a. constructing one or multiple molded bodies in layers by repeatedly applying particulate material by the 3D printing method;
  b. a pre-solidification step for achieving a pre-solidification of the molded body;
  c. an unpacking step, wherein the unsolidified particulate material is separated from the pre-solidified molded body;
  d. a step of repacking the pre-solidified molded body in an inert material; and
  e. a final solidification step, after the repacking step, in which the pre-solidified molded body receives its final strength due to the action of thermal energy while supported by the inert material;
  wherein the particulate material includes a base material and a coating or casing having one or multiple materials for the pre-solidification step and for the final solidification step.

19. The method of claim 18, wherein two different materials are contained in the casing or coating, the one material being essentially destined for the pre-solidification step and the other material essentially being destined for the final solidification step.

20. The method according to claim 19, wherein the final solidification step includes a chemical reaction.

* * * * *